United States Patent [19]

Maselli

[11] 4,218,733

[45] Aug. 19, 1980

[54] ADAPTIVE GAIN CONTROLLER

[75] Inventor: Stephen A. Maselli, Rochester, N.Y.

[73] Assignee: Sybron Corporation, Rochester, N.Y.

[21] Appl. No.: 959,498

[22] Filed: Nov. 13, 1978

[51] Int. Cl.² .................. G06G 7/66; G05B 13/02
[52] U.S. Cl. ............................. 364/105; 318/561;
                                    318/610; 364/118; 364/120
[58] Field of Search .............. 364/105, 106, 118, 120;
                                    318/561, 619, 620, 609, 610

[56] References Cited

U.S. PATENT DOCUMENTS

| | | | |
|---|---|---|---|
| 3,230,351 | 1/1966 | Platt et al. | 318/619 X |
| 3,250,898 | 5/1966 | Vasu | 318/561 X |
| 3,465,768 | 9/1969 | Martin | 364/105 X |
| 3,644,720 | 2/1972 | Falk | 318/619 X |
| 3,911,345 | 10/1975 | Totten | 318/561 |
| 3,950,733 | 4/1976 | Cooper | 364/105 X |

*Primary Examiner*—Joseph F. Ruggiero
*Attorney, Agent, or Firm*—Theodore B. Roessel; J. Stephen Yeo

[57] ABSTRACT

A controller for process control has an adaptive gain. The controller is used as part of a closed feedback loop, and will, in response to different variables, maintain a constant loop gain regardless of non-linearities in the system.

Signals representing the variables are transformed into corresponding active gain factors. The active gain of the controller is computed as a function of the product of the active gain factors and then translated to an output signal. One or more active gain factor is defined as having a first gain factor, at least one breakpoint, and a second gain factor. If two breakpoints are used, a base gain is interposed. Furthermore, one or more variables may have a step function as an active gain factor.

7 Claims, 5 Drawing Figures a.

b.

Gain change is dependent on contact closure.
(CONTACT CLOSURE GAIN FACTOR)

| | ENTRY CHANGE | | |
|---|---|---|---|
| KEYBOARD DISPLAY | ▼ | FAST | ▲ |
| 0.003 | ☐ | ☐ | ☐ |

ADAPTIVE GAIN SETTINGS

| PROCESS | DEVIATION | OUTPUT | REMOTE INPUT | CONTACT | USE/DELETE |
|---|---|---|---|---|---|
| ☐ | ☐ | ☐ | ☐ | ☐ | ☐ |

| BREAKPOINTS | | GAIN FACTORS | | | ACTIVE GAIN LIMIT |
|---|---|---|---|---|---|
| BP1 | % BP2 | GF1 | GF2 | CONTACT | |
| ☐ | ☐ | ☐ | ☐ | ☐ | ☐ |

CONTROLLER RESPONSES

| BASE GAIN | RESET REP./MIN. | PRE-ACT MINUTES |
|---|---|---|
| ☐ | ☐ | ☐ |

ACTIVE GAIN — OUTPUT LIMITS

☐ ☐ ☐

INITIAL SETUP

OUTPUT IND.
NORM ☐▬☐ INVERT
CONTR. ACTION
DIR. ☐▬☐ REV.
PROCESS IND.
LIN. ☐▬☐ √

POWER RESTART VALUE

LAST OUTPUT ☐▬☐ 0 or 100%

ADAPTIVE GAIN CONTROLLER

BACKGROUND OF THE INVENTION

This invention pertains to process controllers and is more particularly concerned with process controllers providing adaptive gain closed loop feedback control.

A conventional process controller is a linear device whose job is to control a process which is usually nonlinear. However, if the range over which control is exercised is usually so narrow that for all practical purposes the process can be considered linear in that range, the controller can perform successfully. When the range of control is so wide that the non-linear nature of the process is strongly manifested, the ordinary controller is not very effective. Such loops are usually run in the manual mode.

Many industrial process control plants with dozens, even hundreds of conventional PI or PID process control loops, have many loops operating in the manual mode. In fact, anywhere from 25 to 50 percent of industrial "loops" are open loops in which the output is set by the operator. These loops are the so-called "problem" loops, where the operators are more confident in their own abilities to meet any emergencies than they are in the controller's.

An example of a "problem" loop is the control of the level of a liquid in a spherical tank. While control could be readily accomplished at the half-full point, where almost-linear conditions prevail, the problem is entirely different at near-full or near-empty set points. At these points, level changes so fast and nonlinearly that very high controller gains are needed to keep the level at the set-point. High gains, however, would result in an unstable system that oscillates; too low a gain can result in tank overflow or an empty tank. To avoid this type of problem, more often than not, control is performed manually.

Consider a "well-behaved" linear system or a process under PID control. If the system is linear than the gain for best response is the same at any setpoint. Such a system handles small disturbances around the setpoint without any problem. Suppose now, that a very large disturbance, such as a drastic setpoint change or a large change in process load, occurs. Because the system gain is usually low, it may take a long time for the system controller to catch up with the error. Thus, a "normally tuned" PID controller can have problems following large relatively fast disturbances in the system it is controlling.

Consider another situation in which the system or the process controlled by a PID controller is nonlinear. A linear controller can do an effective conrol job only if the region of control is so narrow that for all practical purposes the nonlinearity can be neglected. If the setpoint is changed to another setting (assume it is done slowly so the controller can follow the change) the controller will have to be retuned to accommodate the non-linear system's new "gain" characteristics. The gain at the original point will not, as a rule, be the optimum gain setting for the new operating point.

In both cases just described the problems could be avoided, or at least the performance markedly improved, if the controller changed its gain automatically to adapt itself to the new operating conditions. A PID controller having fixed gain cannot, by itself, adapt its behavior to signal or process changes as just described. The problem of constant gain was first recognized back in the late 40's by W. I. Caldwell of Taylor. The fixed gain controller does not have the ability to change gain to compensate for a non-linear process and will provide optimum control at only one point on the variables range. At all other points on the range the controllers gain will be too high or too low.

The adaptive gain controller has been gradually accepted by industry because of its ability to change its overall gain in response to a variable or group of variables, so as to maintain a constant or nearly constant loop gain.

A number of patents relating to adaptive gain closed loop feedback control have issued. These patents describe systems which the applicant believes fall into eight conceptual categories. The general approach taken in a category is similar, however specifics are quite different.

I. Magnitude Based Controller Gain

This concept uses the steady state magnitude of one or more variables to predict the required controller gain. For example, the controller gain could be adjusted by error; as the error increases, so does the gain.

The present invention falls under this broad category, but is readily distinguishable over the prior art by a number of novel features.

The following is a partial listing of previous patents in this category.

| Patent Number | Description |
| --- | --- |
| 3,708,754 | Two fixed gains with switching determined by Controller Output. |
| 3,731,178 | Gain determined by Deviation |
| 2,743,710 | Gain determined by Remote Analog signal. |
| 3,569,681 | Gain based on Deviation. Has zone of linear control. |
| 3,552,428 | Gain based on the Process Variable. |
| 3,906,196 | Gain based on Deviation with maximum gain limit. |
| 3,542,048 | Gain based on Deviation, a Fluidic Device for a Hydrofoil application. |

Other categories will now be briefly described.

II. Transient Based Controller Gain

This concept depends on using both magnitude and time dependent information to predict the controller gain; Reset and Pre-Act functions remain manually adjusted.

The presence of specific frequencies is typically used to detect cycling. Another common idea is to base gain on the deviation of a specific variable.

III. Magnitude Based Controller Responses

This concept uses the steady state magnitude of one or more variables to predict the values of both gain and the dynamic controller responses. For example, Gain, Reset and Pre-Act may all be changes as a function of external signals.

IV. Transient Based Controller Responses

This concept uses both magnitude and time dependent information to adjust both the gain and dynamic controller responses. Depending on how accurate the prediction can be made, this concept could approach the self tuning controller in performance. For example, long sustained offsets might increase reset while oscillation would reduce gain.

V. Induced Disturbance Based Controller Responses

The concept here is to directly measure the process gain and dynamic and set controller responses so that the loop gain and stability remains constant. The method used to measure process characteristics is to induce a disturbance and measure what happens to that specific disturbance.

VI. Process Characteristics Based Controller Responses

This concept measures process gain and dynamics without making additional disturbances. It then readjusts controller parameters to keep performance consistent.

VII. Non-linear Gain Elements

This category covers patents, while they are not negative feedback controllers, can be placed into a traditional feedback loop to produce a form of adaptive control.

SUMMARY OF THE INVENTION

A controller has an adaptive gain responsive to several variables. When used as part of a feedback loop in a process control, the controller will tend to maintain a constant loop gain. The active gain of the controller is computed from the product of active gain factors derived from each of the variables. The active gain factor of some of the variables is two gain factors separated by a breakpoint. Alternating two breakpoints may be used, in which case, the two gain factors are joined by a base gain. The active gain factors of other variables may be a step function. The former type of variables may represent process, deviation, and remote input. Those variables having a step active factor or output and external contact.

Some applications are better served if the same signal represents process and remote input.

BRIEF DESCRIPTION OF THE DRAWINGS

FIG. 3 represents the layout of the response keyboard shown in FIG. 2*a*.

DESCRIPTION OF THE PREFERRED EMBODIMENT

Figure 1:
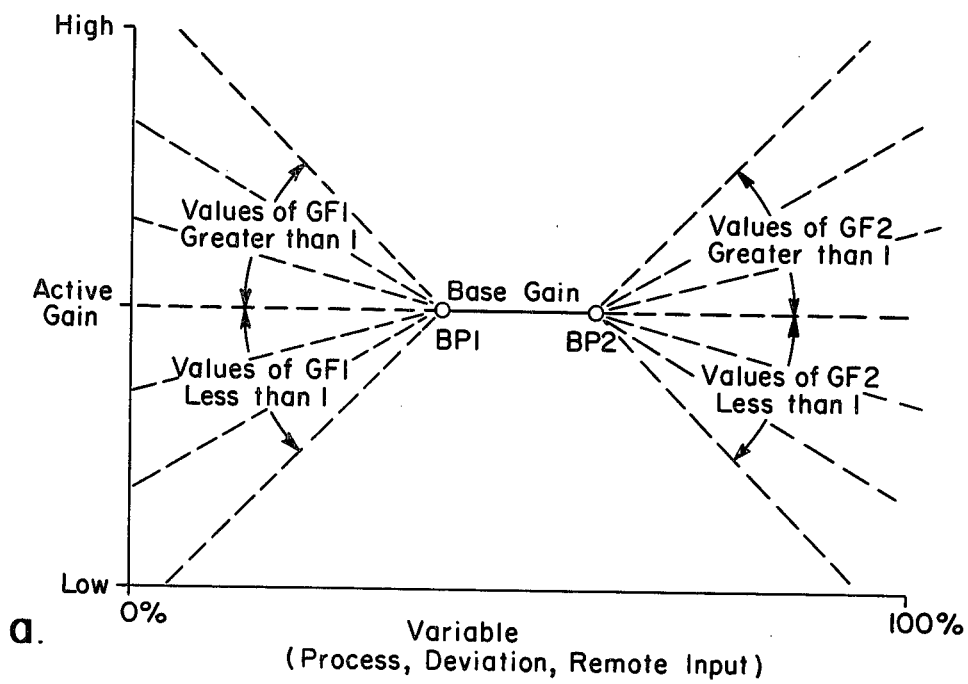
FIG. 1, *a* and *b*, illustrates some possible gain factors corresponding to variables.
Figure 1:
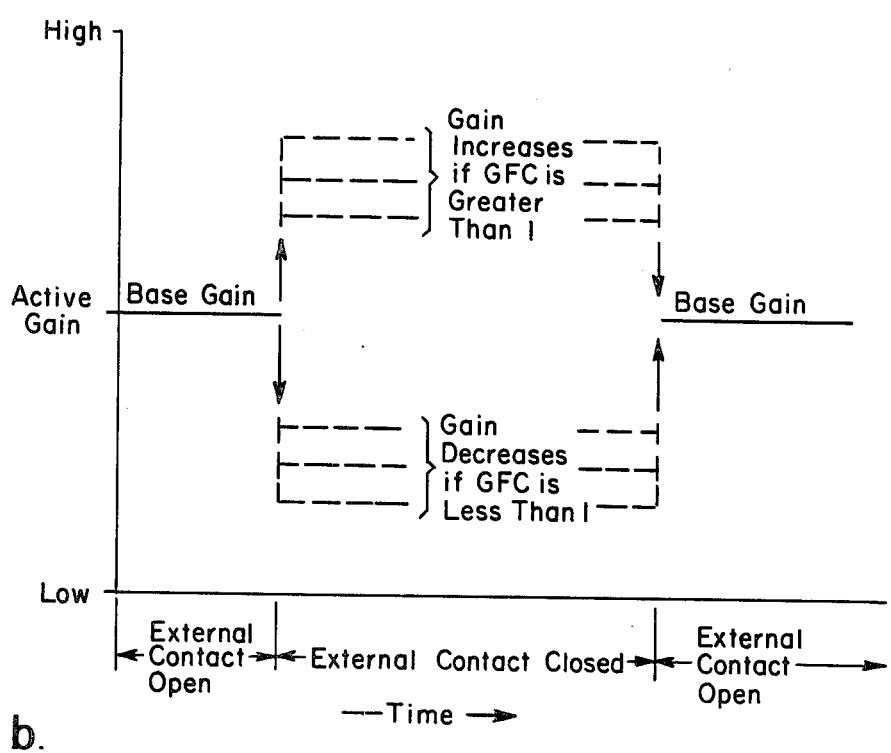

The invention is a programmable process controller having an adaptive gain determined by as many as five different and concurrent variables. The controller is for use in a single loop system and is dynamically responsive to a plurality of variables so as to maintain a constant, or nearly constant closed loop gain. If the gain of the process changes the change in controller gain, should be directly opposite of the process gain to maintain constant loop gain. An adaptive gain function or group of functions is used to change controller gain to compensate for the changes in process gain.

Basically the function of an adaptive gain controller of the present invention is similar to that of an PID controller in the region of the setpoint. The gain is characteristically low and constant, and the loop is "tuned" for fastest response (minimum overshoot and quarter-wave, or Ziegler-Nichols, decay). But when the error or deviation exceeds a certain magnitude, the controller gain will start increasing dynamically with the error. In contrast, the conventional PID controller has constant gain regardless of error.

As a feature of the invention, the controller adapts its gain dynamically to a number of process related variables, in addition to the process error or deviation from the setpoint.

There are five variables that can be used to adapt the gain; the process input, the deviation between process and set-point, the controllers output, a remote input signal and an external contact closure. In one embodiment a function switch for each variable is located on a response section. These five function switches are independently adjustable and may be used with each other in any combination.

The adaptive gain functions for process, deviation, and remote input provide continuous change to controller gain. The output and external contact closure adaptive gain functions provide a step change in controller gain. These five functions are independently adjustable and may be used with each other in any combination.

Because the controller's gain can be changed in response to a variable or group of variables, adaptive gain can be used to reduce the effect of process noise, compensate for non-linear valve characteristics, eliminate overpeaking on startup, compensate for non-linear tank shapes in level control, provide consistant control over a wide range of loads or set-points, improve control on interacting processes, compensate for poor tuning of controllers and so on.

A response keyboard may be used by the operator to set all parameters for controller setup, control response, and adaptive gain response.

The controller gain is automatically tuned after basic gain requirements have been entered by the user through the response keyboard. Thus the user may program the controller gain to be based on the process variable, deviation, the controller output, a contact, a remote input (gain changes are proportional to an externally applied voltage), or to any combination of these variables. In addition, a gain algorithm may be set by the user for independent effects above or below the base gain for each of the above functions. Each function can be determined by the user through the keyboard by programming in the base gain value, the width of the base gain region (gain breakpoint values are programmable), and the gain outside of the breakpoints. Examples of programming will be given later. At this point it will prove useful to define terms used in this description, with reference to FIG. 1:

Active Gain—The actual controller gain which is currently being used. The equation for active gain is:

Active Gain=(Base Gain)×Process Active Gain Factor)×(Deviation Active Gain Factor)×Output Active Gain Factor)×(Remote Input Active Gain Factor)×(External Closure Active Gain Factor).

Note: The last four factors re optional functions and may be used in any combination.

Active Gain Factor—The actual gain factor currently being used for a specific value of a variable.

Active Gain Limit—The maximum or minimum value of active gain when one or more adaptive gain functions are turned on.

Adaptive Gain—The ability to dynamically change the overall gain of the controller.

Adaptive Gain Function Switch—The switch used to control an adaptive gain function.

Base Gain—The number which represents gain in a fixed gain feedback controller (base controller response).

If no adaptive gain functions are turned on, the base gain is the active gain of the controller, and the controller will operate as a fixed gain feedback controller When as adaptive gain function is turned on, all changes in active gain due to the algorithm for that function are based on the base gain.

BP1 (Break Point 1)—A location that determines where the gain will start to change. Unless BP1 and BP2 are at the same location, BP1 is always at a lower point on the variables range than BP2.

BP2 (Break Point 2)—A location that determines where tha gain will start to change. Unless BP1 and BP2 are at the same location, BP2 is always at a higher point on the variables range than BP1.

Display—The six-digit LED display preferably located on the upper left area of the response keyboard.

Entry Change—The act of altering parameters from the response keyboard.

GF1 (Gain Factor 1)—The multiplier of the base gain which is associated with BP1. The value of the gain factor (greater or less than 1) will cause the active gain to increase or decrease. The equation for GF1 for one adaptive gain function (when all other adaptive gain functions are turned off) is $$GF1 = \frac{\text{Active Gain at } (BP1 - 10\%)}{\text{Base Gain}}$$

GF2 (Gain Factor 2)—The multiplier of the base gain which is associated with BP2. The value of the gain factor (greater or less than 1) will cause the active gain to increase or decrease. The equation for GF2 for one adaptive gain function (when all other adaptive gain functions are turned off) is:

$$GF2 = \frac{\text{Active Gain at } (BP2 + 10\%)}{\text{Base Gain}}$$

GFC (Contact Gain Factor)—The multiplier of the base gain associated with an external contact closure. The value of the gain factor (greater or less than 1) will cause the active gain to increase or decrease when the external contact is closed.

$$GFC = \frac{\text{Active Gain During Contact Closure}}{\text{Base Gain}}$$

High and Low Outputs Limits—The maximum or minimum output value, respectively, at which the controller's output value (auto control only) is restricted. These limits do not restrict manual output.

Loop Gain=(Process Gain)×(Active Controller Gain)

Power Restart Value—The value to which the controller's output will return after a power loss.

$$\text{Process Gain} = \frac{\text{Controlled Process Variable}}{\text{Manipulated Variable}}$$

Response Keyboard—A section preferably integral with the controller, containing, for example, 21 calculator type pushbuttons and five toggle switches. Reference is made to the response keyboard illustrated in FIG. 3. The keyboard is used for initial controller setup, setting controller responses, and setting adaptive gain functions.

Use/Delete—A pushbutton switch which turns the adaptive gain function on or off.

Figure 2A:
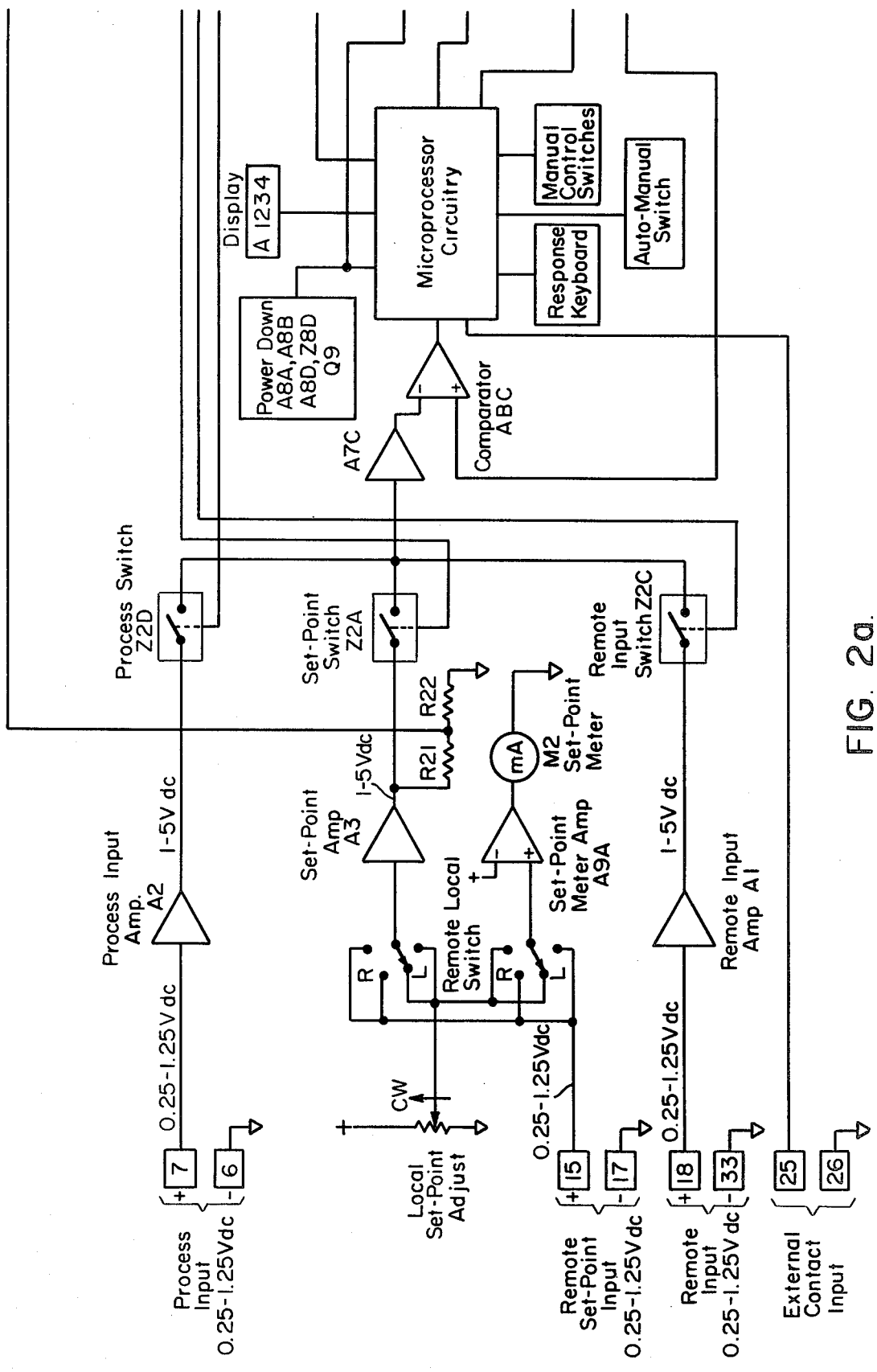
FIG. 2, *a* and *b*, is a schematic drawing of a controller embodying the invention.
Figure 2B:
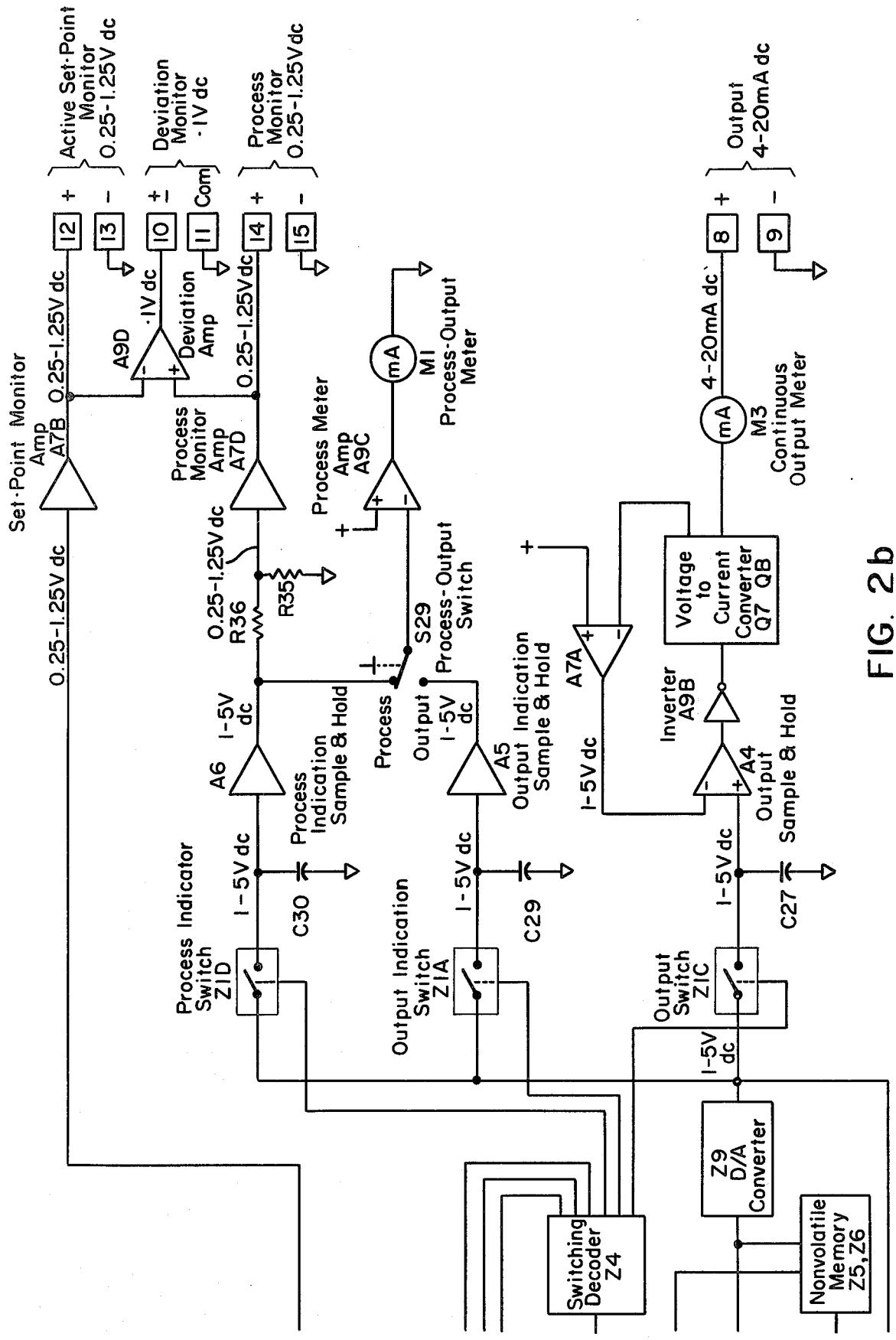

A simplified schematic view of the preferred embodiment of the controller is shown in FIG. 2. The controller as shown has four input circuits, a computing circuit, an output circuit, and three remote circuits.

The input circuit is for receiving analog signals corresponding to the process, a set point, a remote input and an external contact.

The input signals required for the process input, remote set-point input, and remote input are 0.25 to 1.25 V dc. If the signal to one of these inputs is 4 to 20 mA dc, an external 62.5-ohm resistor must be connected across the input terminals to provide the 0.25 to 1.25 V dc.

The 0.25 to 1.25 V dc local set-point signal comes from a regulated voltage reference power supply and a manually adjusted potentiometer. The required set-point signal is selected by the remote-local switch and applied to the set-point amplifier A3 and set-point meter amplifier A9A. The set-point meter amplifier A9A provides a signal to the set-point meter M2 on the front of the controller. The set-point amplifier A3 converts the 0.25 to 1.25 V dc signal to a 1 to 5 V dc signal. This 1 to 5 V dc signal is applied to the set-point switch Z2A which is controlled by the microprocessor circuit later described.

The process input signal is applied to process input amplifier A2 which converts the 0.25 to 1.25 V dc signal to a 1 to 5 V dc signal. This 1 to 5 V dc signal is applied to the process switch Z2D which is controlled by the microprocessor circuit.

The remote input signal is applied to the remote input amplifier A1 which converts the 0.25 to 1.25 V dc signal to a 1 to 5 V dc signal. This 1 to 5 V dc signal is applied to the remote input switch Z2C which is controlled by the microprocessor circuit.

The external contact input is connected directly to the microprocessor circuit.

The computing circuit contains a comparator, a microprocessor and its associated components, a response keyboard, a six-digit LED display, a nonvolatile memory, A-M switching, a manual control circuit, a power down circuit, a switching decoder, and a D/A converter.

The analog input signals are sampled and converted to digital data with a 12-bit resolution, and from thereon all processing is digital. A single D/A circuit is used to convert the analog signal to digital, and later, back to analog. To convert the digital, the D/A is under microprocessor control and is used in a successive approximation mode.

An RCA 1802 CMOS 8 bit microprocessor may be used. Memories associated with the microprocessor are read only memories which contains programs dedicated to housekeeping, algorithms solving gain and interfacing with the internal analog circuitry as well as the outside world. Random access memories function as "scratch pads" temporarily storing information.

As earlier mentioned, the response keyboard is used to set all parameters for initial controller setup, control responses, and adaptive gain functions. A six-digit LED display may indicate parameter values and process values (process, deviation, output, remote input, and external contact closure status). A-M switch and manual control switches are connected directly to the microprocessor circuit.

A non-volatile random access memory is provided to preserve volatile microprocessor "scratchpad" time contents, set-points; and outputs and all values internal with the responsive keyboard in case of power drop or failure. This memory may also serve to deliver pre-programmed adaptive gain algorithms. The non-volatile memory has preferably a 4K bit capacity and may be of the MNOS (metal nitride oxide) type, which is electrically programable.

The power down circuit provides a signal to the microprocessor circuit and to the non-volatile memory any time the power supply voltage drops below a predetermined value. These signals cause the nonvolatile memory to store the digital values of output that the microprocessor circuit is applying to the D/A converter plus keyboard parameters. Should the power fail, the memory will retain all data for up to two years without refreshing. When the power is restored, the digital values stored in the nonvolatile memory are applied to the microprocessor circuit.

The switching decoder is controlled by the microprocessor circuit and is used to actuate the input and the input, output, and indication circuits to the microprocessor circuit in a programmed sequence. For example, when the process input is connected to the microprocessor circuit, the process switch Z2D is closed by a signal from the switching decoder. This connects the process input signal from process input amplifier A2 to one input of comparator A8C. The output of the comparator will change, and the microprocessor circuit will change the output of the D/A converter Z9 until the signal from the D/A converter at the input of the comparator A8C is equal to the process input signal. This updated signal representing the process input value is stored in the microprocessor circuit memory. Also, the switching decoder Z4 closes the process indicating switch Z1D which connects the output of the D/A converter Z9 to the process indicating sample and hold circuit A6, C30.

The controller samples the process being controlled about four times a second. This sampling rate has been practically established as enabling real-time control of most industrial processes.

The output signal is analog having been converted from digital, and may be directed to either the output circuit or the monitor circuit.

The output of the D/A converter Z9 is connected to the output sample and hold capacitor C27 when the switching decoder Z4 closes the output switch Z1C. If the signal from the D/A converter Z9 is different from the value stored on the capacitor C27, the capacitor will change to a value representing the new signal. When the switching decoder Z4 opens the output switch Z1C, the capacitor C27 will hold the new value until updated on a subsequent cycle. The charge on the capacitor C27 is applied to the noninverting input of the output sample and hold amplifier A4. A feedback signal from the voltage-to-current converter is connected to the inverting input of the amplifier.

The output of the sample and hold amplifier A4 is applied through inverter A9B to the voltage-to-current converter Q7, Q8. The voltage-to-current converter has two outputs. One output is 4 to 20 mA dc which is connected to the output terminals through the continuous output meter M3. The second output of the voltage-to-current converter is a 1 to 5 V dc signal which is supplied by amplifier A7A and is connected to the inverting input of output sample and hold amplifier A4. This signal from amplifier A7A is used as a feedback signal to balance output sample and hold amplifier A4.

The output of the D/A converter Z9 is connected to the process indication sample and hold capacitor C30 when the switching decoder Z4 closes the process indicating switch Z1D. If the signal from the D/A converter Z9 is different from the value stored on the capacitor C30, the capacitor will charge to a value representing the new signal. After the switching decoder Z4 opens the process indicating switch Z1D, the capacitor will hold the new value until updated on a subsequent cycle. The charge on capacitor C30 is applied to the input of process indicating sample and hold amplifier A6. The output of the process indicating sampel and hold amplifier A6 is applied to the process-output switch S29 and to the process monitor terminals through process monitor amplifier A7D. The process monitor signal represents the process input signal.

The active set-point monitor signal represents the set-point signal applied to the set-point switch Z2A. A voltage divider consisting of resistors R21 and R22 provides a 0.25 to 1.25 V dc signal from the 1 to 5 V dc output of set-point amplifier A3. This 0.25 to 1.25 V dc signal is applied to the active set-point monitor terminals through set-point monitor amplifier A7B. The deviation monitor represents process deviation from set-point. The inverting input of deviation amplifier A9D is connected to the output of set-point monitor amplifier A7B, and the noninverting input is connected to the output of the process monitor amplifier A7D. If the process signal is greater than the set-point signal, the deviation monitor signal will be positive. The deviation monitor signal will be negative when the process signal is less than the set-point signal.

The output of the D/A converter Z9 is connected to the output indication sample and hold capacitor C29 when the switching decoder Z4 closes the output indicating switch Z1A. If the signal from the D/A converter Z9 is different from the value stored on the capacitor C29, the capacitor will charge to a value representing the new signal. After the switching decoder Z4 opens the output indicating switch Z1A, the capacitor will hold the new value until updated on a subsequent cycle. The charge on capacitor C29 is applied to the input of output indicating sample and hold amplifier A5. The output of the output indicating sample and hold amplifier A5 is applied to the process-output switch S29. A process-output meter indicates process input unless the process-output switch S29 is depressed. Then it will indicate output and valve position.

The controller uses an interacting PID algorithm with the following transfer function (in direct action using the Laplace Operator s):

$$\frac{Eo(s)}{Ein(s)} = K \frac{1 + sT1}{sT1} \times \frac{1 + sT2}{1 + sT3}$$

where
K = proportional gain
T1 = reset rate 1/T1 = reset rate
T2 = Pre-Act time
T3 = T2/16

A controller's active gain is the actual gain currently being used and is the product of the base gain and the active gain factors as shown as previously described. All active gain factors are multipliers and are not values of active gain. The microprocessor circuit multiplies the base gain by the active gain factors. The result is the value of active gain for the current process conditions. The active gain value is displayed when the active gain switch is depressed.

The value of active gain can be calculated for any given set of process conditions. Using the same values for BP1, BP2, GF1, and GF2 as used in the algorithms, the active gain factors for the process deviation and remote input adaptive gain functions can be calculated.

After the active gain factor for each variable is determined, the active gain of the controller for the given set of process conditions can be calculated by use of the active gain equation set forth earlier with the definition of active gain.

If an adaptive gain function is not used, the active gain factor for that function has a value of 1 in the active gain equation.

The parameters that define the adaptive gain algorithms for process, deviation and remote input functions are all set up in the same manner. A large combination of breakpoints gain factors and active gain limits can be used to provide many different adaptive gain algorithms. As each adaptive gain algorithm is set up individually, the number of overall controller algorithms is limitless.

The location of the breakpoints determines where the gain will start to change as a function of the adaptive gain for that variable as shown in FIG. 1. The gain value between the break points is the base gain and never changes.

Both break points can be located at the same range value or they may be set at different values. When the two break points are set at different values BP1 must be at a lower range value than BP2. The active gain between the two break points is equal to the base gain (because the gain does not change), while the active gain beyond the break point changes as determined by the gain factors.

The value of the gain factor determines if the active gain will increase or decrease, starting from the break point.

If the gain factor value is less than 1 (e.g. 0.843), the gain will decrease. When the gain factor value is 1, the gain will not change. If the gain factor value is greater than 1 (e.g. 2.645), the gain will increase.

Both gain factors can increase active gain, both can decrease active gain or either gain factor can increase active gain, while the other decreases active gain. The combinations of gain factors and break points can be used to produce a large variety of algorithms to satisfy a large number of possibilities.

The gain factor values are multipliers. The microprocessor circuit multiplies the base gain by the gain factor for the adaptive gain function. The result is the value of active gain at one and only one point on the range. This point will be 10% downscale from BP1 or 10% upscale from BP2 and it establishes the slope of the line in the algorithm. The value of GF1 determines the value of active gain at a point 10% downscale of BP1, and the value of GF2 determines the value of active gain at a point 10% upscale of BP2. At other points on the range, active gain will be added to or subtracted from the value of active gain for the points established by GF1 and GF2.

In one example, BP1 was set at 40% of range, BP2 was set at 60% of range, the base gain was 5, GF1 equals 0.843, and GF2 equals 1.132. The base gain (5) multiplied by the gain factor (GF1) for BP1 (0.843) results in an active gain value of 4.215. This active gain value of 4.215 is the active gain value at 30% of range. In this algorithm, no other point on the range will have this active gain value of 4.215. The active gain has decreased (because GF1 was less than 1) by a value of 0.785 between 30% and 40% of range. It will decrease by an additional 0.785 of each 10% of range downscale from the location of GF1 at 30% of range. Thus, the active gain value at 20% of range, Point "A", would be the active gain value at 30% of range (4.215) minus 0.785 and would equal 3.43. At Point "B", an additional 10% downscale from Point "A", the active gain would be 3.43 (the value for Point "A") minus 0.785 and would be equal to 2.645.

Above BP2 the active gain will increase because GF2 is greater than 1. The active gain increases by 0.66 between BP2 and 60% and GF2 at 70% and is equal to 5.66 at 70% of range. At 80% of range (Point "X") the active gain has increased an additional 0.66 to equal 6.32, and at 90% (Point "Y") the active gain is equal to 6.98 (end of example).

The output adaptive gain function is similar to the process, deviation, and remote input adaptive gain functions, except the change in controller gain due to the gain factor is a bumpless step change instead of a continuous change. The effect of the bumpless step change in gain is the same as switching a controller to manual, changing the gain, and then switching back to automatic.

The base gain and break points are the same as for the process, deviation, and remote input adaptive gain functions. Both break points can be located at the same range value or they may be set at different values as shown in FIG. 1a. When the two break points are set at different values, BP1 must be at a lower range value than BP2.

The value of the gain factor determines if the gain will increase or decrease, starting from the break point. The active gain beyond the break points is determined by the gain factors. Other than the fact that the gain change is a bumpless step change, the gain factor for the output adaptive gain function operates the same as the gain factors for the process, deviation, and remote input adaptive gain functions above.

The contact closure adaptive gain function is controlled by an external contact. The closure of this external contact can be time related and/or value related to the process. The change in controller gain is a bumpless step change (same as for output adaptive gain function).

Break points BP1 and BP2 are not used with the external contract adaptive gain function. The gain changes when the external contact is closed. When the external contact opens, the gain changes back to base gain. The amount of gain change for this function is determined by gain factor GFC. The value of gain factor GFC determines if the gain will increase or decrease. Gain factor GFC is a multiplier and is not a value of active gain.

The active gain limit functions only when one or more adaptive gain functions are turned on.

The active gain limit can be set at either a minimum value or at a maximum value but not both. The value displayed when the active gain switch, located on the response keyboard of FIG. 2a, is depressed is a value of active gain and not a multiplier.

Process requirements should determine if it is necessary to limit active gain at a high or low value. If gain is not limited at a low value, the controller gain may go so low (because of gain factors less than 1) that the controllers output will not change in response to large changes in the variables. If gain is not limited at a high value and the controller is operating at high gain (because of gain factors greater than 1), the controllers output may become unstable.

Because of the long-standing resistance to adaptive control (for a number of reasons which includes difficulty in understanding the concept, especially by the plant operators: lack of a visable system in a small package; knowledge of computer programming was essential) the programming of the adaptive controller has been made a very simple matter by use of the programming panel. To see how the programming panel works it is best to use an illustrative example. Consider the situation wherein the system is to maintain the liquid level in a conical-shaped tank where the level is determined by the setpoint position. The problem is not so different for an ordinary PID controller except when the operation is confined to near-empty level where the level may vary so fast with volume of the liquid that the controller may not be able to correct fast enough. The illustrated problem has an additional complication; good control is required at any setpoint setting without returning the controller. This is definitely outside ordinary PID controller capabilities but not the adaptive gain controller's.

There are two ways to go about the solution. If one wants to have just adequate control, then one may program in the gain vs. error algorithm tuning it at tank-level midpoint in PID mode using the Nichols-Ziegler method. The adaptive gain controller, however, is capable of much more. It can be programmed to take into account system nonlinearities, eliminate their effect, and then introduce the gain vs. error algorithm to the scrubbed and linearized system to obtain even better performance. A second way will illustrate the highlights of programming.

First, one eliminates the effect of the non-linearity due to the shape of the tank. The way one "linearizes" the nonlinear characteristics of the tank is to construct an inverse characteristics, or something like an inverse transform.

The first step in the programming procedure is to tune the controller in PID mode for ¼-wave response using the section of the response keyboard marked CONTROLLER RESPONSES. This involves setting the base gain and reset rate in rep/min. Step two is the first use of adaptive gain settings. Push PROCESS button, set break point one by pushing BP1 button and adjusting the value by pushing the ENTRY CHANGE up or down buttons. The readout is in percent of range and is continuously displayed on an LED keyboard display. Next set the BP2 using similar procedure; depress the BP2 button and hold the ENTRY CHANGE until the desired value, in percent, is displayed on the KEYBOARD DISPLAY.

The values to use are then determined by observing the process in the automatic mode and marking the point where control starts to degenerate. Then the gain factors (BP1−10% and BP2+10%) are adjusted to produce control based on one-quarter wave decay. Now push the PROCESS then follow by pushing USE/DELETE button and the tank non-linearity has been substantially eliminated and also the controller is in the adaptive gain mode where the gain is a function of the tank level.

Similar procedures can be used to eliminate the valve characteristic at the output and the new algorithm added to the tank algorithm. And so on down the line until all possibilities are exhausted. A self-tuning algorithm may be entered through the same keyboard. Again, the tuning and entering procedure is very simple and consists of nine basic steps; two to tune the base gain, two to set breakpoints, two to enter gain factors, one to set the maximum gain, and finally two steps to activate the algorithm.

In some applications of the controller it has been found that optimum control may be achieved by connecting the same variable signal to two inputs. Specifically, in controlling the pH of a product, excellent results were obtained by wiring the process input and the remote input together. A number of applications, as well as detailed operating instructions are to be found in the Sybron/Taylor publication 1B-11B520, dated August 1978. A copy of that publication was submitted with the patent application of this invention for inclusion in the record.

The overall plant benefits accrued by properly using the adaptive controller are more powerful than using the aerivative. The numerous improvements in loop operation under adaptive control are substantial process.

The main goal is to provide reasonable control over the wide range of conditions in a field situation. It is believed that the new controller will handle most of those problem loops that are now left open, thus providing automatic control in almost cases without ddc computer adaptive control algorithms.

Specific advantages are:
1. Capability of many different algorithms using same hardware.
2. More complex algorithms possible
3. Excellent control and display accuracy
4. No manual drift vs. time
5. Low gain+low reset available simultaneously
6. No range multipliers
7. Better control point accuracy
8. Immune to temperature and humidity
9. Non-volatile memory to startup output at preset value.

I claim:

1. A controller for closed loop control of a process, said controller having the ability to change its active gain to compensate for process non-linearity so as to maintain a substantially constant closed loop gain, and being comprised of:
   a plurality of inputs for receiving signals representing variables;
   computing means for transforming said signals into corresponding active gain factors and for computing the active gain of the controller as a function of the product fo the active gain factors; and
   means for translating the calculated active gain to an output signal;
   wherein at least one of said variables has a corresponding active gain factor defined by a first corresponding gain factor, a breakpoint, and a second corresponding gain factor.

2. The controller of claim 1 wherein said corresponding active gain factor is further defined by said first corresponding gain factor, said breakpoint, a second breakpoint, a corresponding base gain interposed between said breakpoints, and said second corresponding gain factor.

3. The controller of claim 1 wherein each of a first set of said variables has a corresponding active gain factor defined by a first corresponding gain factor, a breakpoint and a second corresponding gain factor and each of a second set of variables has a corresponding active gain factor characterized as a step function.

4. The controller of claim 3 wherein the first set of variables represent process, deviation and remote input and the second set of variables represent output and external contact.

5. The controller of claim 1 wherein each of a first set of variables has a corresponding active gain factor defined by a first corresponding gain factor, a first breakpoint, a second breakpoint, a corresponding base gain interposed between said breakpoints, and a second correspondinng gain factor and each of a second set of variables has a corresponding active gain factor characterized as a step function.

6. The controller of claim 5 wherein the first set of variables represent process, deviation, and remote input and the second set of variables represent controller output and external contact.

7. The controller of claims 4 or 6 wherein one variable in the first set is used for both process and remote output.

* * * * *